US011908178B2

(12) United States Patent
Gladisch et al.

(10) Patent No.: US 11,908,178 B2
(45) Date of Patent: Feb. 20, 2024

(54) VERIFICATION OF COMPUTER VISION MODELS

(71) Applicant: Robert Bosch GmbH, Stuttgart (DE)

(72) Inventors: Christoph Gladisch, Renningen (DE); Christian Heinzemann, Ludwigsburg (DE); Matthias Woehrle, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 17/646,911

(22) Filed: Jan. 4, 2022

(65) Prior Publication Data
US 2022/0230419 A1 Jul. 21, 2022

(30) Foreign Application Priority Data
Jan. 15, 2021 (DE) ................... 10 2021 200 345.1

(51) Int. Cl.
*G06V 10/776* (2022.01)
*G06V 10/762* (2022.01)
*G06V 10/764* (2022.01)

(52) U.S. Cl.
CPC .......... *G06V 10/776* (2022.01); *G06V 10/762* (2022.01); *G06V 10/764* (2022.01)

(58) Field of Classification Search
CPC .. G06V 10/776; G06V 10/762; G06V 10/764; G06V 20/58; G06V 10/774; G06N 3/045; G06N 20/00; G06F 18/214
See application file for complete search history.

(56) References Cited

U.S. PATENT DOCUMENTS

| | | | | |
|---|---|---|---|---|
| 2012/0183213 | A1* | 7/2012 | Robles-Kelly | G06V 40/10 382/165 |
| 2022/0222926 | A1* | 7/2022 | Gladisch | G06V 10/774 |
| 2022/0230072 | A1* | 7/2022 | Gladisch | G06V 10/771 |
| 2022/0230418 | A1* | 7/2022 | Gladisch | G06V 10/82 |
| 2022/0230419 | A1* | 7/2022 | Gladisch | G06V 10/764 |

OTHER PUBLICATIONS

Bargoti and Underwood: "Utiising Metadata to Aid Image Classification in Orchards", IEEE International Conference on Intelligent Robots and Systems (IROS), Workshop on Alternative Sensing for Robot Perception (WASROP), (2015), pp. 1-3.
Engelbrecht, et al.: "Determining the Significance of Input Parameters Using Sensitivity Analysis", International Workshop on Artificial Neural Networks, Springer, Berlin, Heidelberg, (1995), pp. 382-388.
Teodoro, et al.: "Algorithm sensitivity analysis and parameter tuning for tissue image segmentation pipelines", Bioimage informatics, Bioinformatics 33(7), (2017), pp. 1064-1072.
Dosovitskiy, Alexey et al. "CARLA: an Open Urban Driving Simulator" 1st Conference on Robot Learning (CoRL 2017) Mountain View, United States. Nov. 10, 2017. arXiv:1711.03938v1. Retreived from the Internet on Dec. 29, 2021: https://arxiv.org/pdf/1711.03938.pdf. 16 Pages.

* cited by examiner

*Primary Examiner* — Md K Talukder
(74) *Attorney, Agent, or Firm* — NORTON ROSE FULBRIGHT US LLP; Gerard A. Messina

(57) ABSTRACT

Reducing the number of parameters in a visual parameter set based on a sensitivity analysis of how a given visual parameter affects the performance of a computer vision model to provide a verification parameter set having a reduced size.

14 Claims, 8 Drawing Sheets

VERIFICATION OF COMPUTER VISION MODELS

CROSS REFERENCE

The present application claims the benefit under 35 U.S.C. § 119 of German Patent Application No. DE 102021200345.1 filed on Jan. 15, 2021, which is expressly incorporated herein by reference in its entirety.

FIELD

The present invention relates to computer-implemented method for verifying a computer vision model, and an associated apparatus, computer program, and computer readable medium.

BACKGROUND INFORMATION

Computer vision concerns how computers can automatically gain high-level understanding from digital images or videos. Computer vision systems are finding increasing application to the automotive or robotic vehicle field. Computer vision can process inputs from any interaction between at least one detector and the environment of that detector. The environment may be perceived by the at least one detector as a scene or a succession of scenes.

In particular, interaction may result from at least one camera, a multi-camera system, a RADAR system or a LIDAR system.

In automotive computer vision systems, computer vision often has to deal with open context, despite remaining safety-critical. It is, therefore, important that quantitative safeguarding means are taken into account both in designing and testing computer vision functions. Verification of computer vision functions for autonomous driving is typically important for ensuring the safety of such functions, but verification processes require a lot of input from human experts. The verification of computer vision functions may, thus, be further improved.

SUMMARY

According to a first aspect of the present invention, there is provided a computer-implemented method for verifying a computer vision model. In accordance with an example embodiment of the present invention, the method includes:
  obtaining a computer vision model configured to perform a computer vision function characterising elements of observed scenes;
  obtaining a visual parameter specification comprising at least one visual parameter set, wherein a classification or regression performance of the computer vision model is affected by an item of visual data provided based on the at least one visual parameter set;
  providing a first visual data set comprising a subset of items of visual data compliant with the visual parameter specification, and a corresponding subset of items of groundtruth data;
  performing a sensitivity analysis of a plurality of performance scores output from the computer vision model over a domain of the visual parameter specification when a plurality of items of visual data are applied to the visual data set;
  generating a verification parameter specification based on the visual parameter specification and the sensitivity analysis, wherein, compared to the visual parameter specification, the verification parameter specification comprises at least one fewer visual parameter sets or visual parameters, and/or wherein the verification parameter specification comprises at least one visual parameter set having a reduced range;
  verifying the computer vision model by:
  providing a second visual data set comprising a second subset of items of visual data compliant with the verification parameter specification, and a corresponding second subset of items of groundtruth data, wherein the second visual data set is provided using the verification parameter specification; and
  applying at least one verification test to the computer vision model to obtain at least one verification test result.

Advantageously, the computational load and complexity required to verify a computer function may be significantly reduced. A computer vision model may also be more securely verified, because the computational load of the verification calculation may be focused on visual parameters that the computer vision function under verification is more sensitive to. The computer vision function is verified in an empirical and repeatable way that does not require interpretation trade-offs between different human experts to be made, although experts may still provide visual parameters as initial candidates in the verification process.

A computer vision function for an autonomous system is a safety-critical component. To ensure safety, and for liability reasons, the verification of a visual parameter specification (sometimes termed an operational design domain) integrates with the development of an associated computer vision function to provide a safety guarantee. Reducing the parameter space of the verification process enables faster automated verification whilst guaranteeing that sensitive aspects of the computer vision model have been adequately verified.

Verification of computer vision functions using deep neural networks is a major challenge, and crucial for using these functions in safety-critical systems such as autonomous vehicles and robots. How to perform verification, and which attributes should be verified, is a difficult question. Further difficult questions concern the test strategy—how test results should be composed into an overall verification plan and organised, for example, in goal-structured notation (GSN). The prioritization and selection of visual parameters for verification (testing) can be used in a test strategy for structuring a test effort (e.g. GSN) and in test standardization efforts for computer vision functions. In other words, the idea is to use the sensitivity analysis to reduce the complexity of the test strategy.

The present invention is a verification technique for computer vision functions producing test results. These test results can be used to support a release decision for the computer vision function or an autonomous system using the computer vision function. The approach can be combined with various testing techniques such as search-based testing, combinatorial testing, or statistical analysis and measures for computer vision functions.

The techniques may be extended with a pre-selection of attributes (visual parameters) and value ranges which should be tested. In this way, the test effort is reduced and the effectiveness of the testing method is improved, because only relatively more relevant visual parameters are tested.

In other words, it is proposed to apply a global sensitivity analysis to reduce the number of parameters to be verified, whereas the goal of the testing technique is to apply thorough testing to a fixed set of parameters decided by the prior global sensitivity analysis. Therefore, the density of samples of the global sensitivity analysis is much lower than the density of tests, enabling a quicker verification process when the verification is performed by automatic hardware such as a computer.

The visual parameter specification may be refined to comprise visual parameters that cause the computer vision function to have a large variance. Further images chosen as training data using such a visual parameter specification may be useful for training a computer vision model, because the higher variance implies that the images chosen according to such a visual parameter specification contain a lot of "corner cases" that the computer vision function should be able to be deemed safe.

The visual parameter specification may be refined to comprise visual parameters that cause the computer vision function to have a relatively large variance.

Mathematically, the goal of testing is trying to demonstrate that the function under test does not work correctly. A function is verified when testing is unable to show failure of the function. Thus particularly for verification, a subset of parameters with high variance are chosen in order to maximize the probability of finding a failure. Further images chosen as training data using such a visual parameter specification may be useful for verifying a computer vision model, because the higher variance implies that the images chosen according to such a visual parameter specification contain corner cases that the computer vision function would perform more badly on.

Reducing one or more redundant parameters in a visual parameter specification equates to a significant reduction in the size of a parameter space when training or verifying a computer vision model, enabling a faster and more energy efficient training and/or verification process.

Visual parameters are any aspect of an image or video that affect the comprehension of a displayed scene by a machine vision function. As one example, a visual parameter might be the angle of the sun with respect to an ego-vehicle, a time of day, the height and proximity of buildings and trees in the scene, the speed of the ego-vehicle, the speed and location of vehicles relative to the ego-vehicle, the visual characteristics of a road surface in front of the ego vehicle, and the like.

As one example, a wet road surface with the sun directly ahead of the ego-vehicle might result in additional glare being directed towards the windscreen of the ego vehicle. This condition could affect how accurately a computer vision model could classify road signs located forward of the ego vehicle, owing to increased glare. Accordingly, a road sign identification task of a computer vision model would, in the described condition, be more likely to misidentify road signs. Therefore, the performance of the computer vision model would show a higher result variance.

A second aspect of the present invention provides an apparatus for verifying a computer vision model. In accordance with an example embodiment of the present invention, the apparatus includes: an input interface, a processor, a memory and an output interface. The input interface is configured to obtain a computer vision model configured to perform a computer vision function of characterising elements of observed scenes, and to obtain a visual parameter specification comprising at least one visual parameter set. A classification or regression performance of the computer vision model is affected by an item of visual data provided based on the at least one visual parameter set. The input interface is configured to provide a first visual data set comprising a subset of items of visual data compliant with the visual parameter specification, and a corresponding subset of items of groundtruth data.

The processor is configured to perform a sensitivity analysis of a plurality of performance scores output from computer vision model over a domain of the visual parameter specification when a plurality of items of visual data are applied to the visual data set, to generate a verification parameter specification based on the visual parameter specification and the sensitivity analysis, wherein, compared to the visual parameter specification, the verification parameter specification comprises at least one fewer visual parameter sets or visual parameters.

The verification parameter specification comprises at least one visual parameter set having a reduced range. The processor is further configured to verify the computer vision model by providing a second visual data set comprising a second subset of items of visual data compliant with the verification parameter specification, and a corresponding second subset of items of groundtruth data. The second visual data set is provided using the verification parameter specification; and applying at least one verification test to the computer vision model to obtain at least one verification test result.

A third aspect of the present invention provides a computer program comprising machine-readable instructions which, when executed by a processor, is capable of carrying out the computer-implemented method for verifying a computer vision model according the first aspect.

A fourth aspect of the present invention provides a computer readable medium comprising the computer program according to the third aspect.

Embodiments of the aforementioned aspects are disclosed herein and explained in the following description, to which the reader should now refer.

The present definitions have general applicability to this specification.

A visual data set of the observed scenes is a set of items representing either an image such as JPEG or GIF images, or a video. A video is a sequence of images, optionally encoded as necessary in a format such as MPEG.

A computer vision model is a function parametrized by model parameters. The model parameters are learned during training based on the training data set using machine learning techniques. The computer vision model is configured to at least map an item of visual data or a portion, or subset thereof to an item of prediction data. One or more visual parameters define a visual state in that they contain information about the contents of the observed scene and/or represent boundary conditions for capturing and/or generating the observed scene. A latent representation of the computer vision model is an intermediate (i.e. hidden) layer or a portion thereof in the computer vision model.

The computer vision model 16 is, for example, a deep neural network (DNN) comprising a plurality of neural net layers. However, other model topologies conventional to a skilled person may also be implemented according to the present technique. The layers compute latent representations which are higher-level representation of the input image or video sequence.

An item of groundtruth data corresponding to one item of visual data is a classification and/or regression result that the computer vision function is intended to output in response to an image input, when performing correctly. In other words, the groundtruth data represents a correct answer of the computer vision function when input with an item of visual data showing a predictable scene or element of a scene. The term image may relate to a subset of an image, such as a segmented road sign or obstacle.

A visual data set of the observed scenes is a set of items representing either an image or a video, the latter being a sequence of images. Each item of visual data can be a numeric tensor with a video having an extra dimension for the succession of frames. An item of groundtruth data corresponding to one item of visual data is, for example a classification and/or regression result that the computer vision model should output in ideal conditions. For example, if the item of visual data is parameterized in part according to the presence of a wet road surface, and the presence, or not of a wet road surface is an intended output of the computer model to be trained, the groundtruth would return a description of that item of the associated item of visual data as comprising an image of a wet road.

Each item of groundtruth data can be another numeric tensor, or in a simpler case a binary result vector, associated with or referenced to an item in the visual data set. The groundtruth data provides a definitive result concerning an element of a scene in its associated visual data. For example, an item of visual data comprising an image of a 20 km/h speed limit sign would be associated with a result vector confirming that the scene contains a road sign, with further levels of detail being that the road sign is a speed limit sign, that the displayed speed limit is 20 km/h. In this way, the output prediction of a computer vision model applied to the item of visual data can be assessed for correctness by comparison to the associated groundtruth data, and a performance measure of the computer vision function calculated.

A visual parameter specification is, for example, a data structure defining different types of visual phenomena that can affect the performance of a computer vision function performing a function such as, for example, image or video recognition, classification, or regression on a scene, or a portion of the scene. The visual phenomena are encoded by one or more visual parameter sets. For example, a visual parameter set may define parameters as a series of discrete values, such as precipitation intensity. A visual parameter set may define parameters using Boolean conditions, such as a Boolean condition defining the presence or absence of tree cover. Alternatively or in addition, a visual parameter set may define parameters using continuous ranges, such as azimuth angle displacements.

The visual parameter specification may be considered to represent an ontology, taxonomy, dimensions, or language entities defining a restricted view on the world, or an input model. A set of concrete images can be captured (from a real image dataset) or rendered (using a synthetic image generation engine) using the visual parameters.

In an example embodiment of the present invention, the visual parameters of the first or second visual parameter specification may comprise one or any combination selected from the following list: one or more parameters describing a configuration of an image capture arrangement, optionally an image or video capturing device, visual data is taken in or synthetically generated for, optionally, spatial and/or temporal sampling, distortion aberration, colour depth, saturation, noise, absorption, reflectivity of surfaces, one or more light conditions in a scene of an image/video, light bounces, reflections, light sources, fog and light scattering, overall illumination; and/or one or more features of the scene of an image/video, optionally, one or more objects and/or their position, size, rotation, geometry, materials, textures, one or more parameters of an environment of the image/video capturing device or for a simulative capturing device of a synthetic image generator, optionally, environmental characteristics, seeing distance, precipitation characteristics, radiation intensity, image characterizing statistics such as contrast, saturation, noise, or one or more domain-specific descriptions of the scene of an image/video, optionally, one or more cars or road users, or one or more objects on a crossing.

Exemplary embodiments of the present invention are depicted in the figures, which are not to be construed as limiting, and are explained in greater detail below.

DETAILED DESCRIPTION OF EXAMPLE EMBODIMENTS

One or more visual parameters define a visual state of a scene because it or they contain information about the contents of the observed scene and/or represent boundary conditions for capturing and/or generating the observed scene. A typical scene is characterized by a large number of visual parameters, some of which are continuous variables. Therefore, the search space for computing functions over the total number of visual parameters characterizing a typical scene is onerous.

The visual parameters can be for example: camera properties (e.g. spatial- and temporal-sampling, distortion, aberration, color depth, saturation, noise etc.), LIDAR or RADAR properties (e.g., absorption or reflectivity of surfaces, etc.), light conditions in the scene (light bounces, reflections, light sources, fog and light scattering, overall illumination, etc.), materials and textures, objects and their position, size, and rotation, geometry (of objects and environment), parameters defining the environment, environmental characteristics like seeing distance, precipitation-characteristics, radiation intensities (which are suspected to strongly interact with the detection process and may show strong correlations with performance), image characteristics/statistics (such as contrast, saturation, noise, etc.), domain-specific descriptions of the scene and situation (e.g. cars and objects on a crossing), etc. Many more parameters are possible.

These parameters can be seen as an ontology, taxonomy, dimensions, or language entities. They can define a restricted view on the world or an input model. A set of concrete images can be captured or rendered given an assignment/a selection of visual parameters, or images in an already existing dataset can be described using the visual parameters. The advantage of using an ontology or an input model is that for testing an expected test coverage target can be defined in order to define a test end-criterion, for example using t-wise coverage, and for statistical analysis a distribution with respect to these parameters can be defined.

Images, videos, and other visual data along with co-annotated other sensor data (GPS-data, radiometric data, local meteorological characteristics) can be obtained in different ways. Real images or videos may be captured by an image capturing device such as a camera system. Real images may already exist in a database and a manual or automatic selection of a subset of images can be done given visual parameters and/or other sensor data. Visual parameters and/or other sensor data may also be used to define required experiments. Another approach can be to synthesize images given visual parameters and/or other sensor data. Images can be synthesized using image augmentation techniques, deep learning networks (e.g. Generative Adversarial Networks (GANs), Variational Autoencoders (VAEs)), and 3D rendering techniques. A tool for 3D rendering in the context of driving simulation is for example the CARLA tool (Koltun, 2017, available at www.arXiv.org: 1711.03938).

Conventionally, in development testing, and verification of computer vision functions, the input images are defined, selected, or generated based on properties (visual parameters) that seem important according to expert opinion. However, the expert opinion relating to the correct choice of visual parameters may be incomplete, or mislead by assumptions caused by the experience of human perception. Human perception is based on the human perception system (human eye and visual cortex), which differs from the technical characteristics of detection and perception using a computer vision function.

Conventionally, the computer vision function (computer vision model) may be developed or tested on image properties which are not relevant, and visual parameters which are important influence factors may be missed or underestimated. Furthermore, a technical system can detect additional characteristics as polarization, or extended spectral ranges that are not perceivable by the human perception system.

The density of samples of the global sensitivity analysis is much lower than the density of tests. Accordingly, this enables the prioritisation and selection of visual parameters for verification, for structuring a test strategy, or for standardizing testing. Unlike the global sensitivity analysis, the testing/verification then works on a reduced test space (due to the lower number of verification parameters) and thus performs testing at a higher density of tests.

Figure 1:
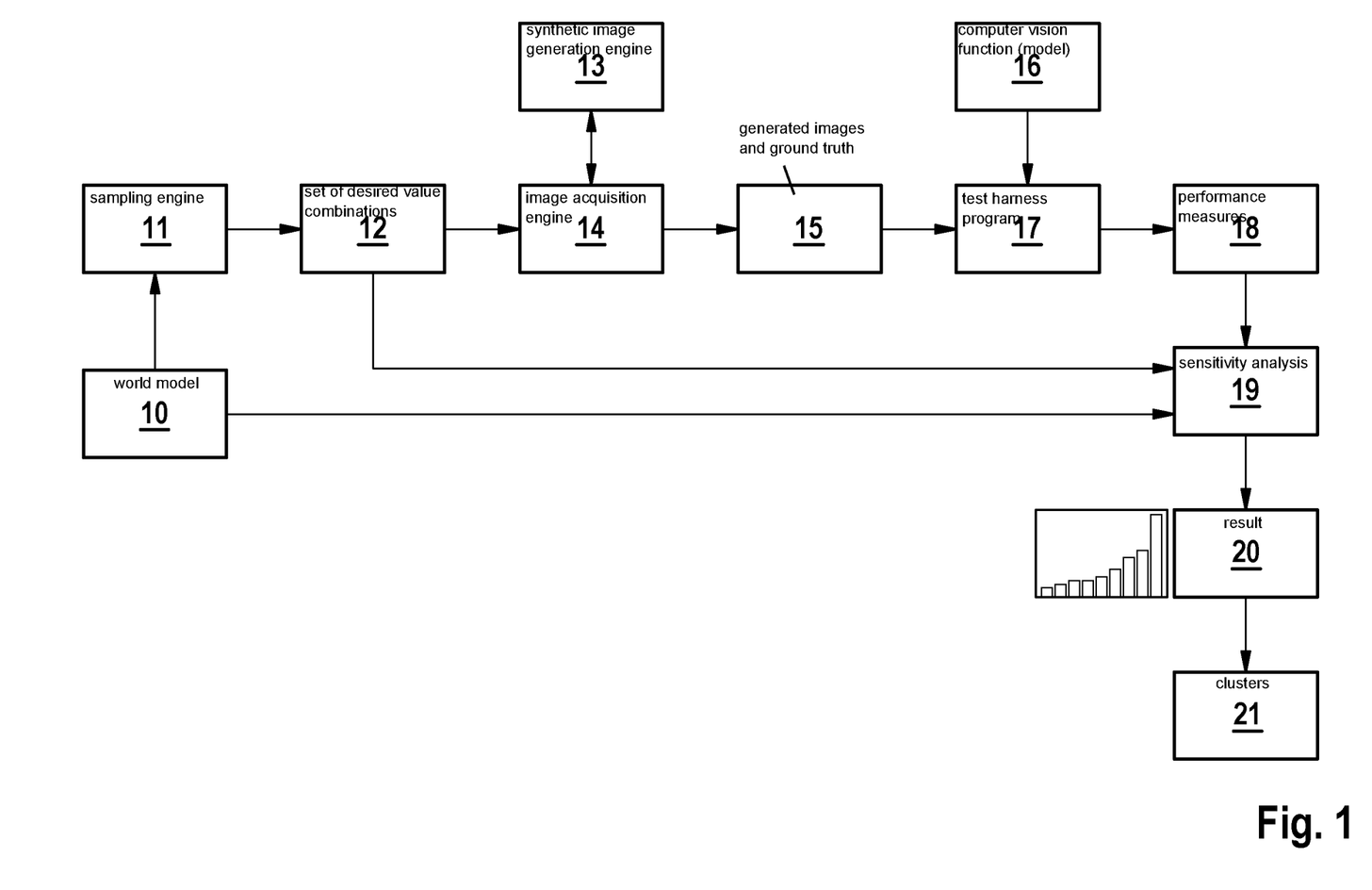
FIG. 1 schematically illustrates a flow diagram describing global sensitivity analysis of computer vision functions, in accordance with an example embodiment of the present invention.

FIG. 1 schematically illustrates a flow diagram describing global sensitivity analysis of computer vision functions. The computer vision functions (models) generated by such a process are the functions that are verified according to the present approach.

A world model 10 comprises visual parameters and value ranges, or discrete values. For example, the world model 10 corresponds to a hypothesised relevant operational design domain (ODD).

A sampling engine 11 creates a data structure comprising a set of desired value combinations 12. The set of desired value combinations 12 is sampled from within the boundary defined by the world model 10. For example, sampling engine 11 may use combinatorial testing, or Latin hypercube sampling to obtain the samples from the world model 10.

In an example, an image acquisition engine 14 communicates the set of desired value combinations 12 to a synthetic image generation engine 13. Optionally, the synthetic image generation engine 13 is the "CARLA" engine described above. This results in an image, image sequence, or video and associated ground truth for value combinations sampled by the sampling engine 12. Alternatively, or in addition, images compliant with the world model 10 may be obtained by the image acquisition engine 14 interrogating an image database or specifying experiments to be performed.

The generated images and ground truth 15 are applied to a test harness program 17 that applies the images to a proposed computer vision function (model) 16. Optionally, the computer vision function 16 is based on a deep neural network. The test harness program 17 compares the predictions (regressions/classifications) of the computer vision function 16 with the groundtruth (part of 15) and calculates one, or several, performance measures 18 using the estimated image output of the computer vision function 16 as compared to a corresponding item of ground truth. In other words, the test harness assesses how well the computer vision model has classified (or provided a correct regression for) the input image. The performance measure 18 may be, for example, confusion matrix, the decoding precision, recall, F-score, intersection of the union, mean average position, for example.

A sensitivity analysis 19 is performed on one, or several, of the performance measures 18 with respect to one or more of the visual parameters of the world model 10, and optionally their value ranges. Optionally, the value ranges are split into sub-ranges. The result 20 is an ordered list of visual parameters related to their performance measures 18 when the computer vision function under test 16 is applied. Optionally, visual parameters and their sub-ranges may be clustered 21 into regions having similar performance, for example.

Box 1 is a practical example of a visual parameter specification. Each of the bracketed text strings such as "spawnpoint", "cam_yaw" are examples of an initial visual parameter set. In the example of box 1, the values of the initial visual parameter specification are a series of discrete values, although alternatively at least one of the visual parameter specification may comprise a range between at least two endpoints. Alternatively, at least one visual parameter set of the visual parameter specification may comprise a plurality of ranges (not illustrated in Box 1).

---

Box 1-example of a first visual parameter specification in "Python"

worldmodel = OrderedDict([  ('spawn_point', [0,3,6,9,12,15]),
                            ('cam_yaw', [−20, −10, 0, 10, 20]),
                            ('cam_pitch', [−10, −5, 0, 5, 10]),
                            ('cam_roll', [−10, −5, 0, 5, 10]),
                            ('cloudyness', [0, 33, 66, 100]),
                            ('precipitation', [0, 50, 100]),
                            ('precipitation_deposits', [0, 50, 100]),
                            ('sun_altitude_angle', -continued Box 1-example of a first visual parameter specification in "Python"

```
          [-10, 0, 33, 66, 100]),
        ('sun_azimuth_angle',
          [0, 45, 90, 135, 180, 225, 270]),
])
```

Typically, the visual parameter specification of Box 1 is defined according to the opinion of an expert. However, the expert may have an incorrect opinion, or be biased. In this case, a computer vision function could be verified on biased parameters.

Figure 2:
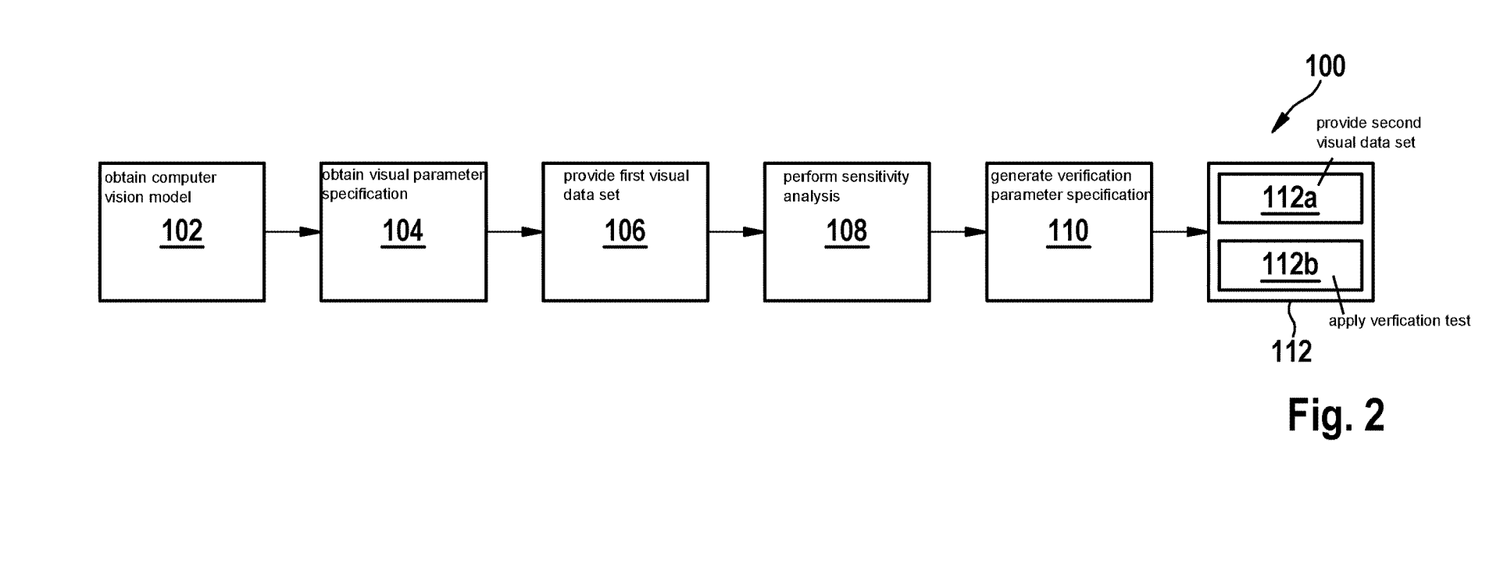
FIG. 2 schematically illustrates an example computer-implemented method according to the first aspect of the present invention.

FIG. 2 schematically illustrates a computer-implemented method according to the first aspect.

The method comprises:
- obtaining 102 a computer vision model configured to perform a computer vision function of characterising elements of observed scenes;
- obtaining 104 a visual parameter specification comprising at least one visual parameter set, wherein a classification or regression performance of the computer vision model is affected by an item of visual data provided based on the at least one visual parameter set;
- providing 106 a first visual data set comprising a subset of items of visual data compliant with the visual parameter specification, and a corresponding subset of items of groundtruth data;
- performing 108 a sensitivity analysis of a plurality of performance scores output from the computer vision model over a domain of the visual parameter specification when a plurality of items of visual data are applied to the visual data set;
- generating 110 a verification parameter specification based on the visual parameter specification and the sensitivity analysis, wherein, compared to the visual parameter specification, the verification parameter specification comprises at least one fewer visual parameter sets or visual parameters, and/or wherein the verification parameter specification comprises at least one visual parameter set having a reduced range;
- verifying 112 the computer vision model by:
  - providing 112a a second visual data set comprising a second subset of items of visual data compliant with the verification parameter specification, and a corresponding second subset of items of groundtruth data, wherein the second visual data set is provided using the verification parameter specification; and
  - applying 112b at least one verification test to the computer vision model to obtain at least one verification test result.

Therefore, steps 102, 104, 106, and 108 according to the first aspect are analogous to the operations described above in FIG. 1.

The first aspect also includes generating a verification parameter specification. The verification parameter specification uses the result of the sensitivity analysis 108 to reduce the complexity, or search space, of a verification process 112 of the computer vision model.

An embodiment provides generating, using the computer vision model, a plurality of predictions of elements of observed scenes in the subset of items of visual data, wherein the plurality of predictions comprise at least one prediction of a classification label and/or at least one regression value of at least one item in the subset of visual data; and comparing the plurality of predictions of elements in the subset of items of visual data with the corresponding subset of groundtruth data, to thus obtain the plurality of performance scores.

In an embodiment, the plurality of performance scores comprises, or depends on, any one or any combination of a confusion matrix, precision, recall, F1 score, intersection of union, or mean average.

Box 2 illustrates an example of a verification parameter specification. The verification parameter specification is automatically modified according to the computer implemented method of the first aspect to discover visual parameters that cause a low, or average performance of the computer vision model 16. Such visual parameters require additional verification and are a high priority for inclusion into the verification parameter specification.

Many different modifications to the visual parameter sets can be made. For example, at least one element of a visual parameter set can be deleted, increased, decreased, or added. In Box 2, the "cloudiness" and "precipitation parameters have been reduced in upper scope to 85 down from 100, and the "sun altitude angle" parameter has been reduced in scope by removal of its final element. The "precipitation" parameter has been up-sampled with the addition of two additional elements. The entire "cam yaw" parameter has been deleted. The foregoing is a specific example of how the visual parameter specification is automatically altered and many variations are possible, based on the outcome of the sensitivity analysis.

As another example, the visual parameters "sun_altitude" and "sun_azimuth" form a first visual parameter cluster. The visual parameters "cam_yaw", "campitch", "cam_roll" form a second visual parameter cluster. The clusters may be identifiable because the sensitivity scores of each visual parameter in the first and second cluster meet an identification condition.

An identification condition is, optionally, that a difference $\delta_b$ of the magnitude of the two performance scores of "sun_altitude" and "sun_azimuth" is small compared to the prominence of the "sun_altitude" performance score relative to the next largest cluster 54 as measured by distance $\delta_a$. This, therefore, constitutes an identification condition enabling the computer implemented method to group the visual parameters "sun_altitude" and "sun_azimuth" as a first cluster in the second visual parameter specification. The verification may be performed based on a clustered subset of visual parameters, once identified.

Box 2-example of a verification parameter specification

```
worldmodel =
OrderedDict([  ('spawn_point', [0,3,6,9,12,15]),
               (‘cam_yaw’, [-20, -10, 0, 10, 20]),
               ('cam_pitch', [-10, -5, 0, 5, 10]),
               ('cam_roll', [-10, -5, 0, 5, 10]),
               ('cloudyness', [0, 33, 66, 85, 100]),
               ('precipitation', [0, 50, 70, 75, 80, 85, 100 ]),
               ('precipitation_deposits', [0, 50, 100]),
               ('sun_altitude_angle', [-10, 0, 33, 66, 100 ]),
               ('sun_azimuth_angle',
                 [0, 45, 90, 135, 180, 225, 270]),
])
```

A given computer-implemented verification algorithm executed over the parameter specification of box 2, as compared to box 1, will execute in a reduced amount of time. Therefore, parameters that are less relevant to the sensitivity of a computer vision function do not take up excessive computational resources during verification.

In an embodiment, providing the second visual data set comprises sampling the at least one visual parameter set using for example, combinatorial testing, search-based testing, or Latin hypercube sampling.

In an embodiment, the verification parameter specification comprises at least one fewer visual parameters compared to the visual parameter specification, and/or wherein at least one visual parameter of the verification parameter specification has a reduced numerical scope as compared to the corresponding at least one visual parameter of the visual parameter specification, thus providing a reduced verification parameter space.

In an embodiment, generating the verification visual parameter specification comprises modifying the at least one visual parameter set by dividing at least one visual parameter set of the visual parameter specification into at least a first and a second modified visual parameter set, or combining a first and a second visual parameter set of the visual parameter specification into a cluster.

In an embodiment, the first visual data set is provided based on a sampling of the visual parameters of the visual parameter specification, and the second visual data set is provided based on a sampling of the visual parameters of the verification parameter specification, wherein the sampling technique applied to the visual parameters of the verification parameter specification is different to the sampling technique applied to the sampling of the visual parameters of the visual parameter specification.

Figure 3:
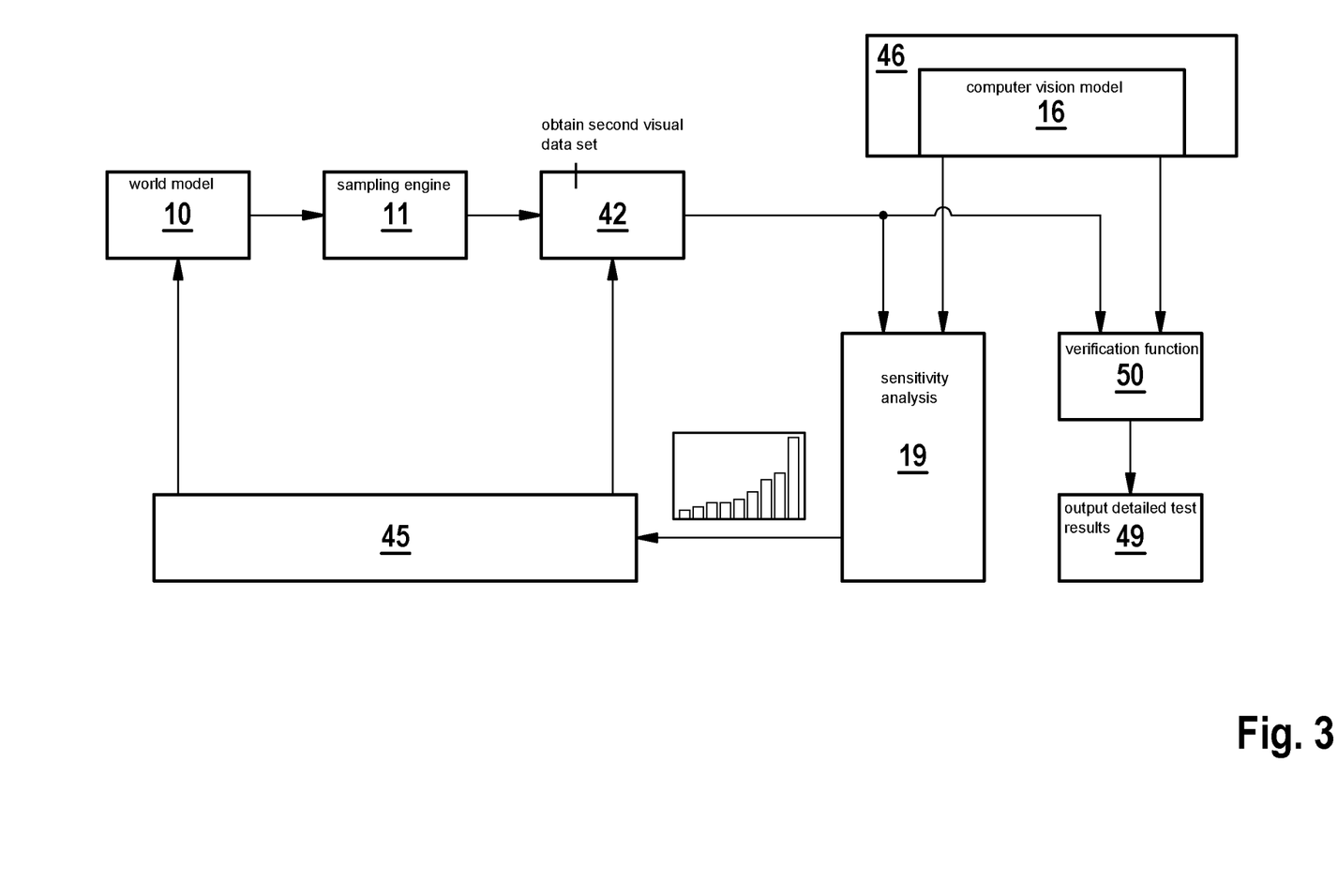
FIG. 3 schematically illustrates a flow diagram describing the provision of a verification function for computer vision models, in accordance with an example embodiment of the present invention.

FIG. 3 schematically illustrates a flow diagram describing the provision of a verification function for computer vision models.

In FIG. 3, function blocks having the same functionality as described in FIG. 2 are provided with like numbering. Block 50 represents the verification function implemented by steps 110 and 112 of the method according to the first aspect. Optionally, the method outputs detailed test results 49. If a computer vision model 16 fails the verification process through repeatedly providing inadequate verification test results, a new or redesigned computer vision model 16 may be substituted. Optionally, the computer vision model 16 may be tested as part of an autonomous system or robot provided as a "test harness".

Figure 4:
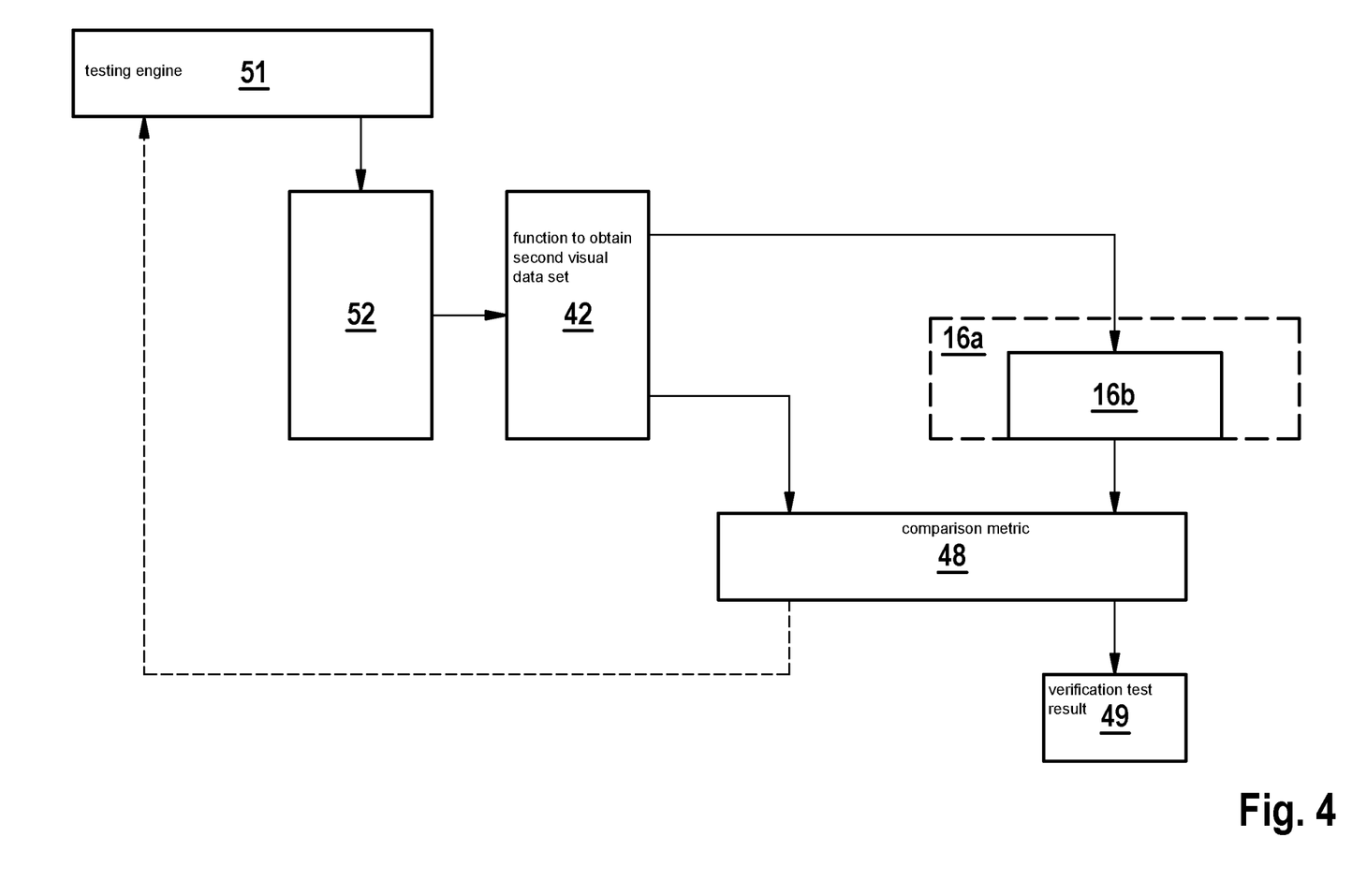
FIG. 4 schematically illustrates an example of a computer vision model verification function, in accordance with the present invention.

FIG. 4 schematically illustrates an example of a computer vision model verification function.

The verification of the computer vision model 16 will now be discussed. Based on the verification parameter specification obtained at step 110, the computer vision function 16 used to generate the verification parameter specification is tested by function 50. A wide variety of existing computer vision function testing techniques can be applied to the computer vision model 16 represented by the testing engine 51.

For example, search-based testing, combinatorial testing, or statistical analysis using an existing sampling technique (such as random or hypercube sampling) may be applied in 51. The same procedure is applied:

The testing engine 51 generates a set of test parameters sampled from the verification parameter set.

A second visual data set, for the purposes of verification, is obtained by function 42 based on the set of test parameters, supplemented by associated ground truth. It is not essential that the second visual data set is obtained based on the approach used to obtain the input images provided as the first visual data set in step 106.

The computer vision model 16 (which is considered to be the system under test) is executed on the second visual data set and associated ground truth. For each image, a set of images, or video of the second visual dataset, an output from the computer vision model 16 is obtained. A comparison metric 48 between the ground truth and the output of the computer vision function 16 is computed and optionally fed back to the testing engine 51 to refine the generation of test cases (for example, as applied in search-based testing). A test end criterion is met, verification time lapsing, or a given degree of verification coverage having been attained.

The performance scores available during and at the end of the verification process optionally used to provide the verification test result 49. For example, on average, weighted average, or the worst verification result may be used from the comparison metric 48. An aggregation may be performed of all tests, or per test.

According to an embodiment, the verification test result 49 is output. For example, the verification test result 49 may be output as a machine-readable data structure or a machine-readable computer file, and/or displayed via a graphical user interface.

Therefore, the verification technique for a computer vision model 16 is improved through the use of global sensitivity analysis and clustering. The improvement is achieved by the selection of improved test parameters and value ranges.

An embodiment provides applying a plurality of verification tests to the computer vision model, wherein the at least one verification test result comprises an average, weighted average, or worst-case test result from the plurality of test results.

Figure 5:
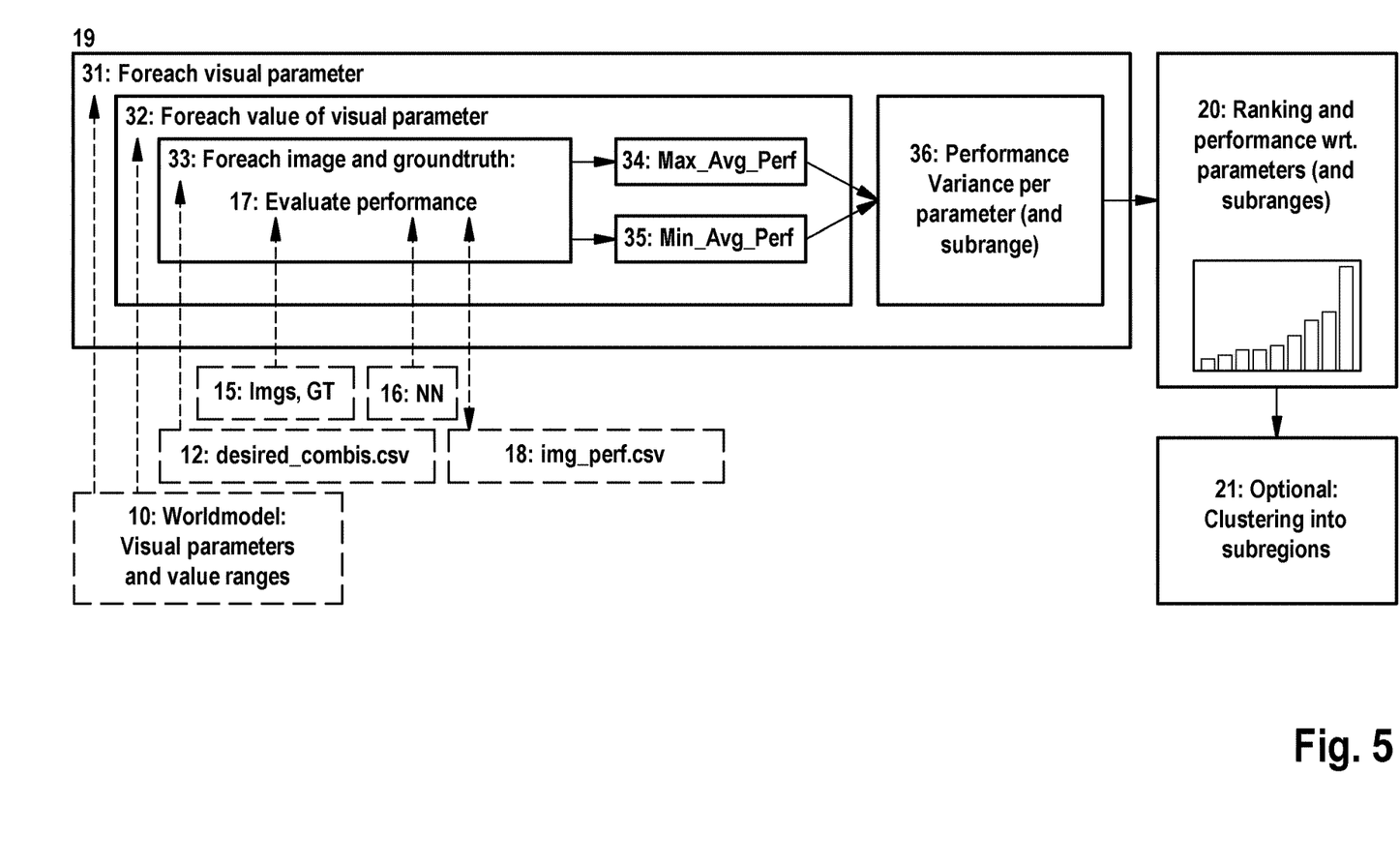
FIG. 5 schematically illustrates an example of a global sensitivity analysis function for a computer vision model, in accordance with the present invention.

FIG. 5 schematically illustrates an example of a global sensitivity analysis function for a computer vision model.

In general, sensitivity analysis (or, more narrowly, global sensitivity analysis) can be seen as the numeric quantification of how the uncertainty in the output of a model or system can be divided and allocated to different sources of uncertainty in its inputs. This quantification can be referred to as sensitivity, or robustness. In the context of this specification, the model can, for instance, be taken to be the mapping, $$\Phi: X \to Y$$

from visual parameters (or visual parameter coordinates) $X_i$, i=1, ..., n based on which items of visual data have been captured/generated/selected to yield performance scores (or performance score coordinates) $Y_j$, j=1, ..., m based on the predictions and the groundtruth. If m is equal to one, there is only one performance score. However, m can be greater than one.

A variance-based sensitivity analysis, sometimes also referred to as the Sobol method or Sobol indices is a particular kind of (global) sensitivity analysis. To this end, samples of both input and output of the aforementioned mapping $\Phi$ can be interpreted in a probabilistic sense. In fact, as an example a (multi-variate) empirical distribution for input samples can be generated. Analogously, for output samples a (multi-variate) empirical distribution can be computed. A variance of the input and/or output (viz. of the performance scores) can thus be computed. Variance-based sensitivity analysis is capable of decomposing the variance of the output into fractions which can be attributed to input coordinates or sets of input coordinates. For example, in case of two visual parameters (i.e. n=2), one might find that 50% of the variance of the performance scores is caused by (the variance in) the first visual parameter ($X_1$), 20% by (the variance in) the second visual parameter ($X_2$), and 30% due to interactions between the first visual parameter and the second visual parameter. For n>2 interactions arise for more than two visual parameters. Note that if such interaction turns out to be significant, a combination between two or more visual parameters can be promoted to become a new visual dimension and/or a language entity. Variance-based sensitivity analysis is an example of a global sensitivity analysis.

Hence, when applied in the context of this specification, an important result of the variance-based sensitivity analysis is a variance of performance scores for each visual parameter. The larger a variance of performance scores for a given visual parameter, the more performance scores vary for this visual parameter. This indicates that the computer vision model is more unpredictable based on the setting of this visual parameter. Unpredictability when training the computer vision model 16 can be used to identify parameters that should be verified more carefully, and hence to de-emphasize parameters that do not require verification at high resolution.

The example of the sensitivity analysis function 19 of FIG. 5 operates on the performance scores output from the computer vision model 16 in combination with the original items of visual data (image) and their groundtruth 15. The performance 17 of the computer vision model 16 is evaluated for each pair of images and groundtruth, yielding a maximum average performance 34 and a minimum average performance 35 for each pair of image and ground truth.

Optionally, at least one of either the maximum average performance 34 and a minimum average performance 35 are evaluated for each image and groundtruth pair provided using the same visual parameter 32, or both of the maximum average performance 34 and a minimum average performance 35. This enables a performance variance per parameter (and subbranch) 36 to be calculated. The sensitivity analysis function 19 is iterated over a plurality of visual parameters in the first visual parameter specification.

It is not essential that the sensitivity analysis function 19 is iterated over every visual parameter in the first visual parameter specification. Accordingly, a performance variance per parameter 36 (and optionally subrange) is calculated for a plurality of parameters in the first visual parameter specification.

The performance variance per parameter 36 enables a ranking of performance with respect to parameters (and sub-ranges) to be performed in a ranking unit 20. Optionally, multiple parameters may affect the performance of the computer vision model 16, and these may be clustered into subregions.

Figure 6:
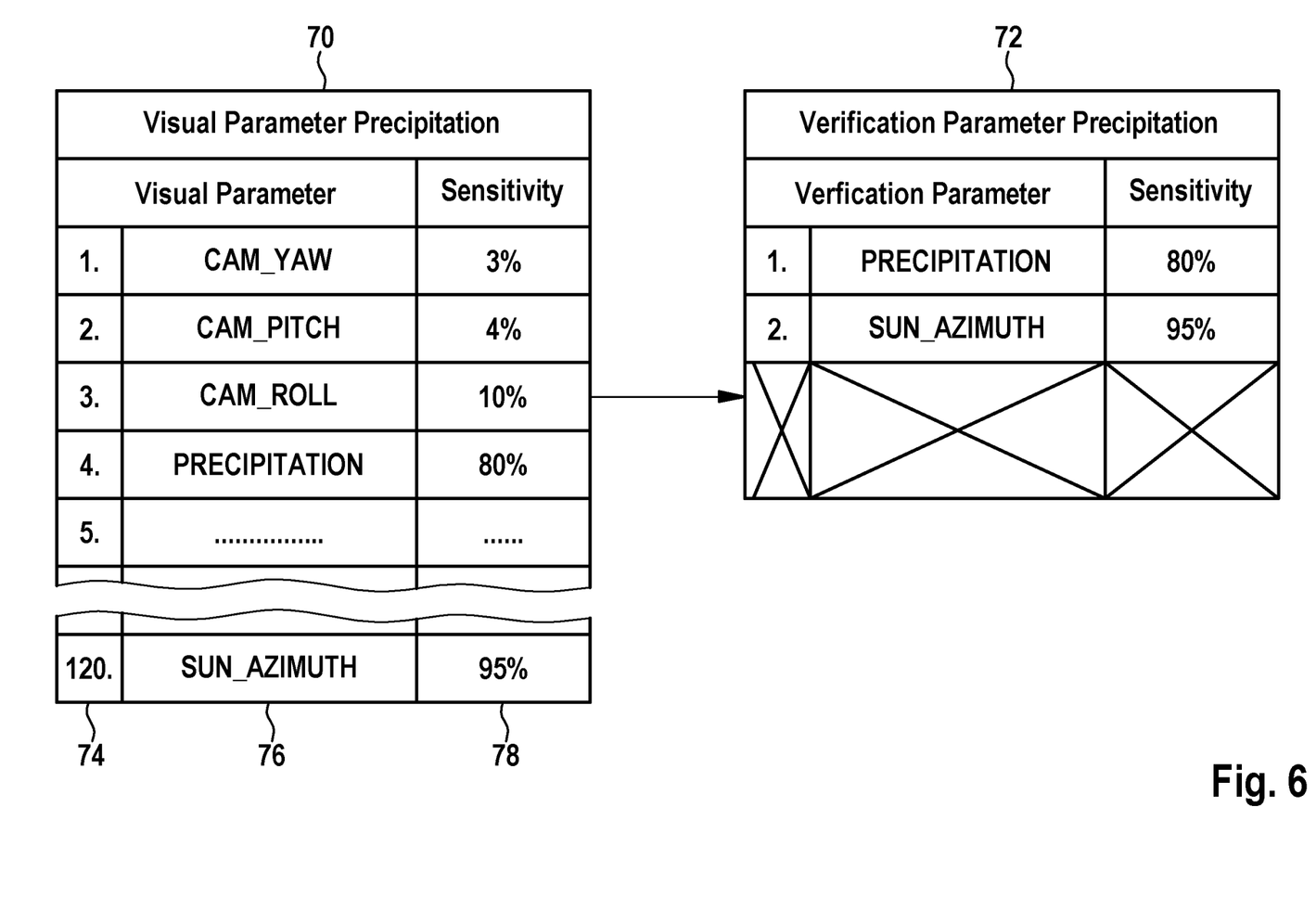
FIG. 6 schematically illustrates an example of how a visual parameter specification is transformed into a verification parameter specification, in accordance with the present invention.

FIG. 6 schematically illustrates an example of how a visual parameter specification 70 is transformed into a verification parameter specification 72.

For example, the visual parameter specification 70 comprises an optional visual parameter numbering field 74, a visual parameter name field 76, and a sensitivity score field 78. Following a sensitivity analysis, the visual parameter specification summarises the sensitivity of the computer vision model 16 to the input data. A verification parameter specification 72 is formed by selecting a subset of the visual parameter specification 70 based at least on the sensitivity score field 78 of each visual parameter. For example, a verification threshold may be set, and if a visual parameter exceeds the threshold of the verification threshold, it must automatically be placed into the verification parameter specification.

Optionally, a verification resource metric may be provided based on the total amount of computing time or resource available to perform the verification process. The verification resource metric may enable the visual parameters of the visual parameter specification 70 to be included in the verification parameter specification 72 according to the amount of computing time or resource available to perform a verification process.

As an example, the verification resource metric may be a vector defining a plurality of sensitivity categories for verification. For example, any visual parameter having a calculated sensitivity score above a first threshold, such as 80%, must be included in the verification parameter specification to be verified at a first verification sampling rate. For example, any visual parameter having a calculated sensitivity score below the first threshold, but above a second threshold, such as 50%, included in the verification parameter specification to be verified at a second verification sampling rate which is different to the first verification sampling rate. For example, the second verification sampling rate may be lower than the first verification sampling rate. For example, any visual parameter having a calculated sensitivity score below the second threshold may be omitted from the verification parameter specification.

An embodiment provides removing one or more visual parameters from the verification parameter specification, or adding one or more visual parameters to the verification parameter specification to form an amended verification parameter specification, providing a third visual data set comprising a third subset of items of visual data compliant with the amended verification parameter specification, and a corresponding third subset of items of groundtruth data, wherein the third visual data set is provided using the amended verification parameter specification, and applying a further verification test to the computer vision model using the third visual data set to obtain a further verification test result.

Figure 7:
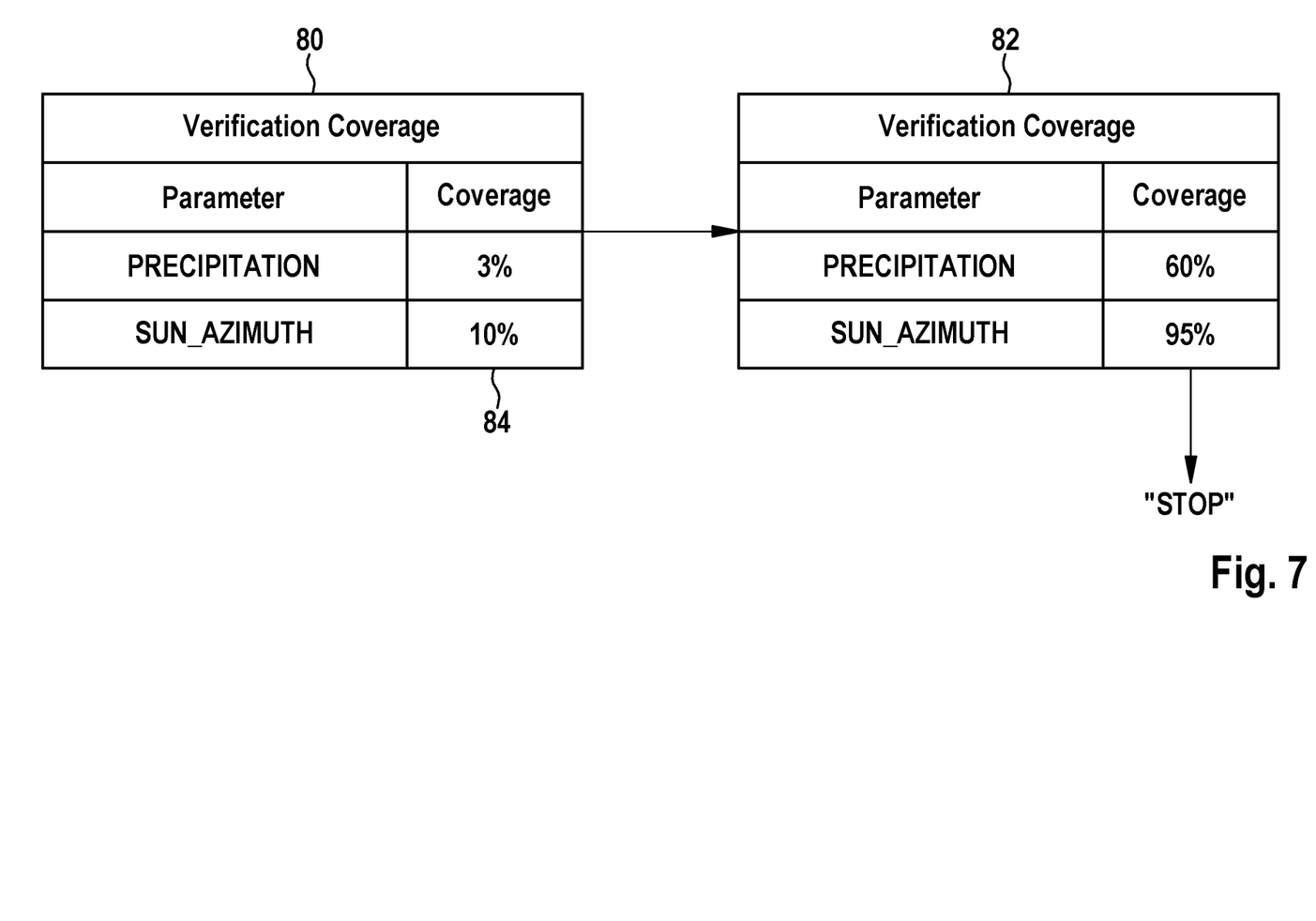
FIG. 7 schematically illustrates an example of how a verification coverage data structure tracks the completeness of a verification process, in accordance with an example embodiment of the present invention.

FIG. 7 schematically illustrates an example of how a verification coverage data structure 80, 82 tracks the completeness of a verification process.

A verification coverage data structure 80 is illustrated at a first-time point, where the visual parameter "precipitation" has been verified according to a sampled coverage of 95%, and the "sun_azimuth" has been sampled to a coverage of 10%.

A predefined state for stopping the verification may be calculated, for example, on the basis of the global sensitivity analysis. For example, the "sun_azimuth" parameter in the verification parameter specification of FIG. 6 appears to have a higher sensitivity score than the visual parameter "precipitation". Accordingly, the verification coverage of the "sun_azimuth" visual parameters may need to be more complete than the verification coverage of the "precipitation" visual parameters. Accordingly, the predefined state for stopping the verification process in the example of FIG. 7 is that the visual parameter "sun_azimuth" has received a verification coverage of 95%, and the visual parameter "precipitation" has received a verification coverage of 60%. A skilled person will appreciate that many different predefined states for automatically stopping the verification process on the basis of verification coverage may be provided. The predefined state stopping the verification process is proportional to, or calculated on the basis of, the sensitivity of the visual parameters included in the verification parameter specification.

An embodiment provides, for each verification test applied to the computer vision model, storing in a verification coverage record at least one visual parameter describing each item of visual data from the second visual data set used to perform the each verification test, and stopping the verification test when the verification coverage record reaches a predefined state.

In an embodiment, performing the sensitivity analysis further comprises computing a plurality of variances of the plurality of performance scores with respect to the visual parameters of the visual parameter specification, and ranking the visual parameters of the visual parameter specification based on the computed plurality of variances.

In an embodiment, displaying the at least one verification test result via a graphical user interface.

Figure 8:
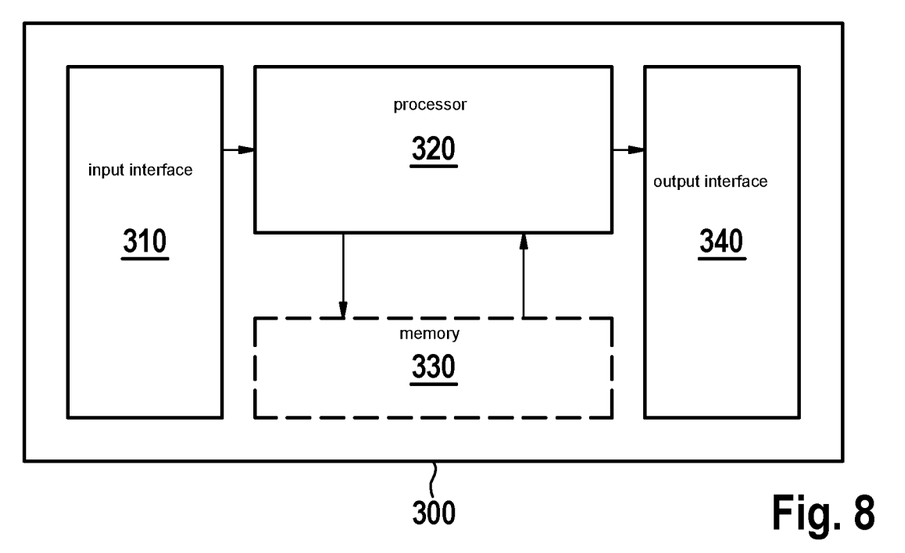
FIG. 8 schematically illustrates an apparatus in accordance with the second aspect of the present invention.

FIG. 8 schematically illustrates an apparatus in accordance with the second aspect. A second aspect provides an apparatus 300 for verifying a computer vision model, comprising: an input interface 310, a processor 320, a memory 330 and an output interface 340.

The input interface 310 is configured to obtain a computer vision model configured to perform a computer vision function of characterising elements of observed scenes, and to obtain a visual parameter specification comprising at least one visual parameter set. A classification or regression performance of the computer vision model is affected by an item of visual data provided based on the at least one visual parameter set. The input interface is configured to provide a first visual data set comprising a subset of items of visual data compliant with the visual parameter specification, and a corresponding subset of items of groundtruth data.

The processor 320 is configured to perform a sensitivity analysis of a plurality of performance scores output from the computer vision model over a domain of the visual parameter specification when a plurality of items of visual data are applied to the visual data set, to generate a verification parameter specification based on the visual parameter specification and the sensitivity analysis, wherein, compared to the visual parameter specification, the verification parameter specification comprises at least one fewer visual parameter sets or visual parameters, and/or The verification parameter specification comprises at least one visual parameter set having a reduced range. The processor is further configured to verify the computer vision model by providing a second visual data set comprising a second subset of items of visual data compliant with the verification parameter specification, and a corresponding second subset of items of groundtruth data. The second visual data set is provided using the verification parameter specification; and applying at least one verification test to the computer vision model to obtain at least one verification test result.

In an example, the data processing apparatus 300 is a personal computer, server, cloud-based server, or embedded computer. It is not essential that the processing occurs on one physical processor. For example, it can divide the processing task across a plurality of processor cores on the same processor, or across a plurality of different processors, or virtual machines. The processor may be a Hadoop™ cluster, or provided on a commercial cloud processing service. A portion of the processing may be performed on non-conventional processing hardware such as a field programmable gate array (FPGA), an application specific integrated circuit (ASIC), one or a plurality of graphics processors, application-specific processors for machine learning, and the like.

The memory 330 of the apparatus 300 stores a computer program 350 according to the fourth aspect that, when executed by the processor 320, causes the processor 320 to execute the functionalities described by the computer-implemented methods according to the first and second aspects. According to an example, the input interface 310 and/or output interface 340 is one of a USB interface, an Ethernet interface, a WLAN interface, or other suitable hardware capable of enabling the input and output of data samples from the apparatus 300. In an example, the apparatus 300 further comprises a volatile and/or non-volatile memory system 330 configured to receive input observations as input data from the input interface 310.

In an example, the apparatus 300 is an automotive embedded computer comprised in a vehicle, in which case the automotive embedded computer may be connected to sensors and actuators present in the vehicle. For example, the input interface of the apparatus may interface with one or more of an engine control unit providing velocity, fuel consumption data, battery data, location data and the like. For example, the output interface 340 of the apparatus 300 may interface with one or more of a plurality of brake actuators, throttle actuators, fuel mixture or fuel air mixture actuators, a turbocharger controller, a battery management system, the car lighting system or entertainment system, and the like.

A third aspect provides computer program comprising machine-readable instructions which, when executed by a processor, is capable of carrying out either (i) the computer-implemented method according to the first aspect, or (ii) the computer-implemented method according to the second aspect, or (iii) the computer-implemented method according to the third aspect A fourth aspect provides a computer readable medium comprising at least one of the computer programs according to the fifth aspect The examples provided in the drawings and described in the foregoing written description are intended for providing an understanding of the principles of this specification. No limitation to the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for verifying a computer vision model, comprising the following steps:
   obtaining a computer vision model configured to perform a computer vision function of characterising elements of observed scenes;
   obtaining a visual parameter specification including at least one visual parameter set, wherein a classification or regression performance of the computer vision model is affected by an item of visual data provided based on the at least one visual parameter set;
   providing a first visual data set including a subset of items of visual data compliant with the visual parameter specification, and a corresponding subset of items of groundtruth data;
   performing a sensitivity analysis of a plurality of performance scores output from the computer vision model over a domain of the visual parameter specification when a plurality of items of visual data are applied to the visual data set;
   generating a verification parameter specification based on the visual parameter specification and the sensitivity analysis, wherein, compared to the visual parameter specification, the verification parameter specification includes at least one fewer visual parameter sets or visual parameters, and/or wherein the verification parameter specification includes at least one visual parameter set having a reduced range; and verifying the computer vision model by:
providing a second visual data set including a second subset of items of visual data compliant with the verification parameter specification, and a corresponding second subset of items of groundtruth data, wherein the second visual data set is provided using the verification parameter specification, and applying at least one verification test to the computer vision model to obtain at least one verification test result.

2. The computer-implemented method according to claim 1, wherein the plurality of performance scores are provided by:
generating, using the computer vision model, a plurality of predictions of elements of observed scenes in the subset of items of visual data, wherein the plurality of predictions include at least one prediction of a classification label and/or at least one regression value of at least one item in the subset of visual data; and
comparing the plurality of predictions of elements in the subset of items of visual data with the corresponding subset of groundtruth data, to thus obtain the plurality of performance scores.

3. The computer-implemented method according to claim 1, further comprising:
applying a plurality of verification tests to the computer vision model,
wherein the at least one verification test result includes an average, or a weighted average, or worst-case test result, from the plurality of test results.

4. The computer-implemented method according to claim 1, wherein the providing of the second visual data set includes sampling the at least one visual parameter set using one of combinatorial testing, or search-based testing, or Latin hypercube sampling.

5. The computer-implemented method according to claim 1, wherein the plurality of performance scores includes or depends on, any one or any combination of a confusion matrix, or precision, or recall, or F1 score, or intersection of union, or mean average.

6. The computer-implemented method according to claim 1, further comprising:
removing one or more visual parameters from the verification parameter specification, or adding one or more visual parameters to the verification parameter specification, to form an amended verification parameter specification;
providing a third visual data set including a third subset of items of visual data compliant with the amended verification parameter specification, and a corresponding third subset of items of groundtruth data, wherein the third visual data set is provided using the amended verification parameter specification;
applying a further verification test to the computer vision model using the third visual data set to obtain a further verification test result.

7. The computer-implemented method according to claim 1, wherein the first visual data set is provided based on a sampling of the visual parameters of the visual parameter specification, and the second visual data set is provided based on a sampling of the visual parameters of the verification parameter specification, wherein a sampling technique applied to the visual parameters of the verification parameter specification is different to a sampling technique applied to the sampling of the visual parameters of the visual parameter specification.

8. The computer-implemented method according to claim 1, further comprising:
for each verification test applied to the computer vision model, storing in a verification coverage record at least one visual parameter describing each item of visual data from the second visual data set used to perform the each verification test;
stopping the verification test when the verification coverage record reaches a predefined state.

9. The computer-implemented method according to claim 1, wherein the performing of the sensitivity analysis further includes:
computing a plurality of variances of the plurality of performance scores respect to the visual parameters of the visual parameter specification; and
ranking the visual parameters of the visual parameter specification based on the computed plurality of variances.

10. The computer-implemented method according to claim 1, wherein the generating of the verification visual parameter specification includes modifying the at least one visual parameter set by dividing at least one visual parameter set of the visual parameter specification into at least a first and a second modified visual parameter set, or combining a first and a second visual parameter set of the visual parameter specification into a cluster.

11. The computer-implemented method according to claim 1, wherein the verification parameter specification includes at least one fewer visual parameters compared to the visual parameter specification, and/or at least one visual parameter of the verification parameter specification has a reduced numerical scope as compared to the corresponding at least one visual parameter of the visual parameter specification, thus providing a reduced verification parameter space.

12. The computer-implemented method according to claim 1, further comprising:
displaying the at least one verification test result via a graphical user interface.

13. An apparatus for verifying a computer vision model, comprising:
an input interface;
a processor;
a memory; and
an output interface;
wherein the input interface is configured to obtain a computer vision model, which is configured to perform a computer vision function of characterising elements of observed scenes, and to obtain a visual parameter specification including at least one visual parameter set, wherein a classification or regression performance of the computer vision model is affected by an item of visual data provided based on the at least one visual parameter set;
wherein the input interface is configured to provide a first visual data set including a subset of items of visual data compliant with the visual parameter specification, and a corresponding subset of items of groundtruth data;
wherein the processor is configured to perform a sensitivity analysis of a plurality of performance scores output from the computer vision model over a domain of the visual parameter specification when a plurality of items of visual data are applied to the visual data set, to generate a verification parameter specification based on the visual parameter specification and the sensitivity analysis, wherein, compared to the visual parameter specification, the verification parameter specification includes at least one fewer visual parameter sets or visual parameters, and/or wherein the verification parameter specification comprises at least one visual parameter set having a reduced range; and wherein the processor is configured to verify the computer vision model by:

providing a second visual data set including a second subset of items of visual data compliant with the verification parameter specification, and a corresponding second subset of items of groundtruth data, wherein the second visual data set is provided using the verification parameter specification; and applying at least one verification test to the computer vision model to obtain at least one verification test result.

14. A non-transitory computer readable medium on which is stored a computer program for verifying a computer vision model, the computer program, when executed by a processor, causing the processor to perform the following steps:

obtaining a computer vision model configured to perform a computer vision function of characterising elements of observed scenes;

obtaining a visual parameter specification including at least one visual parameter set, wherein a classification or regression performance of the computer vision model is affected by an item of visual data provided based on the at least one visual parameter set;

providing a first visual data set including a subset of items of visual data compliant with the visual parameter specification, and a corresponding subset of items of groundtruth data;

performing a sensitivity analysis of a plurality of performance scores output from the computer vision model over a domain of the visual parameter specification when a plurality of items of visual data are applied to the visual data set;

generating a verification parameter specification based on the visual parameter specification and the sensitivity analysis, wherein, compared to the visual parameter specification, the verification parameter specification includes at least one fewer visual parameter sets or visual parameters, and/or wherein the verification parameter specification includes at least one visual parameter set having a reduced range; and verifying the computer vision model by:

providing a second visual data set including a second subset of items of visual data compliant with the verification parameter specification, and a corresponding second subset of items of groundtruth data, wherein the second visual data set is provided using the verification parameter specification, and applying at least one verification test to the computer vision model to obtain at least one verification test result.

* * * * *